United States Patent
Hosoya et al.

(10) Patent No.: US 9,777,601 B2
(45) Date of Patent: Oct. 3, 2017

(54) MUFFLER AND MUFFLING DEVICE INCLUDING THE SAME

(71) Applicants: MITSUBISHI HEAVY INDUSTRIES, LTD., Tokyo (JP); MITSUBISHI HEAVY INDUSTRIES COMPRESSOR CORPORATION, Tokyo (JP)

(72) Inventors: Hiroyuki Hosoya, Tokyo (JP); Toshifumi Kudo, Tokyo (JP); Takuro Koda, Hiroshima (JP)

(73) Assignees: MITSUBISHI HEAVY INDUSTRIES, LTD., Tokyo (JP); MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/038,921

(22) PCT Filed: Jun. 16, 2014

(86) PCT No.: PCT/JP2014/065927
§ 371 (c)(1),
(2) Date: May 24, 2016

(87) PCT Pub. No.: WO2015/098148
PCT Pub. Date: Jul. 2, 2015

(65) Prior Publication Data
US 2016/0376930 A1   Dec. 29, 2016

(30) Foreign Application Priority Data

Dec. 26, 2013   (JP) .................................. 2013-270461

(51) Int. Cl.
*F01N 13/00*   (2010.01)
*F01D 25/30*   (2006.01)
(Continued)

(52) U.S. Cl.
CPC .............. *F01D 25/30* (2013.01); *F02C 7/045* (2013.01); *F04D 17/122* (2013.01);
(Continued)

(58) Field of Classification Search
CPC ....... F01D 25/30; F02C 7/045; G10K 11/161; F05D 2260/963; F04D 29/665
(Continued)

(56) References Cited

U.S. PATENT DOCUMENTS

| | | | | |
|---|---|---|---|---|
| 4,169,501 A | * | 10/1979 | Takeuchi | ............. B60K 11/085 |
| | | | | 123/41.49 |
| 5,046,663 A | * | 9/1991 | Bittmann | ............. B60H 1/2209 |
| | | | | 126/110 B |

(Continued)

FOREIGN PATENT DOCUMENTS

| | | |
|---|---|---|
| EP | 1 498 584 A1 | 1/2005 |
| EP | 1 612 769 A2 | 1/2006 |

(Continued)

OTHER PUBLICATIONS

English translation of Written Opinion of the International Searching Authority (form PCT/ISA/237), issued Aug. 5, 2014, for International Application No. PCT/JP2014/065927.

(Continued)

*Primary Examiner* — Forrest M Phillips
(74) *Attorney, Agent, or Firm* — Birch, Stewart, Kolasch & Birch, LLP (57) ABSTRACT

Provided are: a muffler that can suitably obtain an attenuation effect of a sound wave; and a muffling device including the same. The muffler is installed on a wall surface of a pipe conduit where a gas flows. The muffler includes: a front surface exposed to an inner surface of the pipe conduit; a bottom surface facing the front surface; and a side surface disposed between the front surface and the bottom surface (Continued)

and covering a space between the front surface and the bottom surface. The front surface is formed with a plurality of through-holes, and the number of through-holes arrayed in a gas flow direction is one or two, and the number thereof arrayed in a direction orthogonal to the gas flow direction is 10 or more.

13 Claims, 7 Drawing Sheets (51) Int. Cl.
  F04D 17/12      (2006.01)
  F02C 7/045      (2006.01)
  F04D 29/42      (2006.01)
  F04D 29/66      (2006.01)
  G10K 11/16      (2006.01)
(52) U.S. Cl.
  CPC ....... *F04D 29/4213* (2013.01); *F04D 29/665* (2013.01); *G10K 11/161* (2013.01); *F05D 2260/963* (2013.01)
(58) Field of Classification Search
  USPC ........................................................ 181/238
  See application file for complete search history.

(56) References Cited

U.S. PATENT DOCUMENTS

| | | | | |
|---|---|---|---|---|
| 6,792,907 B1* | 9/2004 | Kostun | ..................... | F01N 1/02 123/184.57 |
| 7,690,478 B2* | 4/2010 | Kostun | .............. | F02M 35/1222 123/184.57 |
| 7,934,581 B2* | 5/2011 | Kim | ...................... | F04D 29/665 123/184.53 |
| 2008/0173271 A1* | 7/2008 | Prior | .................. | F02M 35/1216 123/184.57 |
| 2010/0193282 A1 | 8/2010 | Kim et al. | | |

FOREIGN PATENT DOCUMENTS

| | | |
|---|---|---|
| JP | 2004-28107 A | 1/2004 |
| JP | 2004-509313 A | 3/2004 |
| JP | 2008-138687 A | 6/2008 |
| JP | 2008-531899 A | 8/2008 |
| JP | 2012-159259 A | 8/2012 |
| JP | 2012-517549 A | 8/2012 |
| WO | WO 02/25174 A1 | 3/2002 |
| WO | WO 2006/090152 A1 | 8/2006 |

OTHER PUBLICATIONS

Extended European Search Report issued Nov. 15, 2016 in corresponding European Application No. 14 874 483.2.
Decision to Grant a Patent of Japan patent application No. 2013-270461, dated Jan. 28, 2016.
International Search Report, issued in PCT/JP2014/065927, dated Aug. 5, 2014.
Written Opinion of the International Searching Authority, issued in PCT/JP2014/065927(PCT/ISA/237), dated Aug. 5, 2014.

* cited by examiner

MUFFLER AND MUFFLING DEVICE INCLUDING THE SAME

FIELD

The present invention relates to a muffler installed in piping through which air flows and a muffling device including the same.

BACKGROUND

There is a rotary machine that rotates a turbine blade and an impeller fixed to a rotary shaft or compresses and scavenges a gas by the rotating turbine blade and impeller when the gas (air, flue gas) flows from a compressor, a supercharger, a steam turbine, a gas turbine, and the like. There may be a case where this kind of rotary machine makes some sounds when the gas flows. In this case, there may be a case in which a sound absorbing member is provided or a muffler to attenuate such sounds is installed in piping that makes sounds.

As such a muffler, there is a muffler including: a plate-shaped member formed with through-holes on a front surface; and a member that forms a space between the member and the plate-shaped member, and adapted to attenuate noise via the through-holes based on the principle of Helmhortz resonance (refer to Patent Literatures 1 and 2) Further, Patent Literature 3 discloses a structure in which sound waves transmitted inside a flow passage is reduced by forming recessed portions and bores inside the flow passage where a gas flows.

CITATION LIST

Patent Literatures

Patent Literature 1: Japanese Translation of PCT International Application Publication No. 2004-509313
Patent Literature 2: Japanese Laid-open Patent Publication No. 2012-159259
Patent Literature 3: Japanese Translation of PCT International Application Publication No. 2008-531899

SUMMARY

Technical Problem

As disclosed in Patent Literatures 1 and 2, a sound wave generated inside a flow passage can be reduced by forming a through-hole facing the flow passage where the gas flows and further providing a closed space connected to the through-hole. However, an attenuation effect obtained by the mufflers disclosed in Patent Literatures 1 and 2 may be insufficient. Further, in the case of providing the recessed portions directly in the gas-flowing passage like the device disclosed in Patent Literature 3, time and labor may be required in manufacturing the device.

Therefore, the present invention is directed to providing a muffler that can suitably obtain an attenuation effect of a sound wave and a muffling device including the same.

Solution to Problem

According to an aspect of the present invention, a muffler installed on a wall surface of a pipe conduit in which a gas flows, includes: a front surface exposed to an inner surface of the pipe conduit; a bottom surface facing the front surface; and a side surface disposed between the front surface and the bottom surface, and configured to cover a space between the front surface and the bottom surface. The front surface is formed with a plurality of through-holes, the number of through-holes arrayed in a flow direction of the gas is one or two, and the number of the through-holes arrayed in a direction orthogonal to the flow direction of the gas is 10 or more.

Advantageously, in the muffler, the number of the through-holes arrayed in the direction orthogonal to the flow direction of the gas is 20 or less on the front surface.

Advantageously, in the muffler, the side surface is a member integrally formed with the front surface.

Advantageously, the muffler further includes an adjustment mechanism configured to move the bottom surface relative to the front surface and adjust volume of a space between the front surface and the bottom surface.

According to another aspect of the present invention, a muffling device includes: a plurality of the mufflers as described above; and a holding section housing the plurality of mufflers and fixed to the wall surface.

Advantageously, in the muffling device, the holding section is formed with a plurality of recessed portions to house the mufflers in a direction parallel to flow of the gas.

Advantageous Effects of Invention

According to the present invention, the sound wave attenuation effect can be suitably obtained.

DESCRIPTION OF EMBODIMENTS

In the following, the present invention will be described with reference to the attached drawings. Note that the present invention is not limited by the following embodiments. Further, components in the following embodiments may include those easily conceivable by men skilled in the art or those substantially equivalent thereto.

Figure 1:
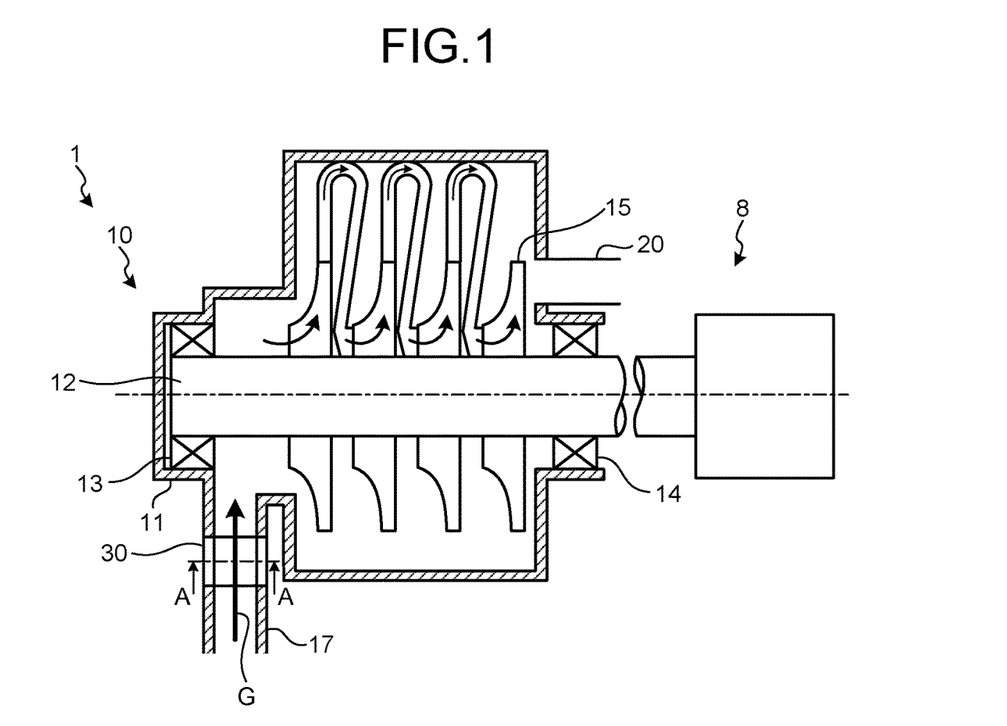
FIG. 1 is a schematic diagram illustrating a general structure of a compressor unit including a muffling device.

FIG. 1 is a schematic diagram illustrating a general structure of a compressor including a muffling device. As illustrated in FIG. 1, a compressor unit 1 includes a compressor 10 and a drive source 8 to rotate a rotary shaft 12 of the compressor 10. For the drive source 8, various kinds of mechanisms to rotate the rotary shaft 12 can be used, such as a motor that electrically rotates the rotary shaft, and a turbine and the like that rotates the rotary shaft by rotating a turbine blade by supplying a flue gas, a combustion gas, and steam.

The compressor 10 is a centrifugal compressor, and includes a casing 11, the rotary shaft 12, bearings 13 and 14, an impeller 15, a supply air duct 17, an exhaust air duct 20, and a muffling device 30. The casing 11 has a hollow shape and is fixed to a base such as foundation. Inside the casing 11, the rotary shaft 12, bearings 13 and 14 and impeller 15 are disposed. The casing 11 is a fixed portion of the rotary machine. Further, the casing 11 is connected to the supply air duct 17 and the exhaust air duct 20, and the supply air duct 17 and the exhaust air duct 20 are connected to the hollow portion inside thereof.

The rotary shaft 12 is inserted into the casing 11. The rotary shaft 12 has one end portion projecting outward from the casing 11, and connected to the drive source 8. The rotary shaft 12 is rotated by the drive source 8 as described above. The bearings 13 and 14 are disposed between the casing 11 and the rotary shaft 12, and support the rotary shaft 12 to the casing 11 in a rotatable manner. The bearing 13 and the bearing 14 are disposed so as to interpose the impeller 15 therebetween in an axial direction of the rotary shaft 12.

The compressor 10 includes a plurality of impellers (turbine blades) 15. The plurality of impellers (turbine blades) 15 is fixed to the rotary shaft 12 and rotated together with the rotary shaft 12. The supply air duct 17 is connected to an inlet port of the casing 11. The inlet port is disposed at one axial end portion of the casing 11, namely, the bearing 13 side in the present embodiment. The exhaust air duct 20 is connected to an outlet port of the casing 11. The outlet port is disposed on the other axial end portion of the casing 11, namely, the bearing 14 side in the present embodiment. The muffling device 30 is installed at the supply air duct 17. The muffling device 30 will be described later.

The compressor unit 1 has the rotary shaft 12 rotated by the drive source 8. When the rotary shaft 12 is rotated, the compressor 10 has the impellers 15 rotated together with the rotary shaft 12. When the compressor 10 has the impellers 15 rotated, a gas G is sucked into the casing 11 from the supply air duct 17 via the inlet port. The gas G sucked into the casing 11 is boosted in process of passing through the impellers 15, and generated compressed fluids are discharged to the exhaust air duct 20 from the outlet port. Thus, the compressor unit 1 sucks the gas G from the supply air duct 17 by rotating the impellers 15, and exhausts the gas G from the exhaust air duct 20 after compression. The gas G compressed at the compressor unit 1 is utilized for various purposes.

Figure 2:
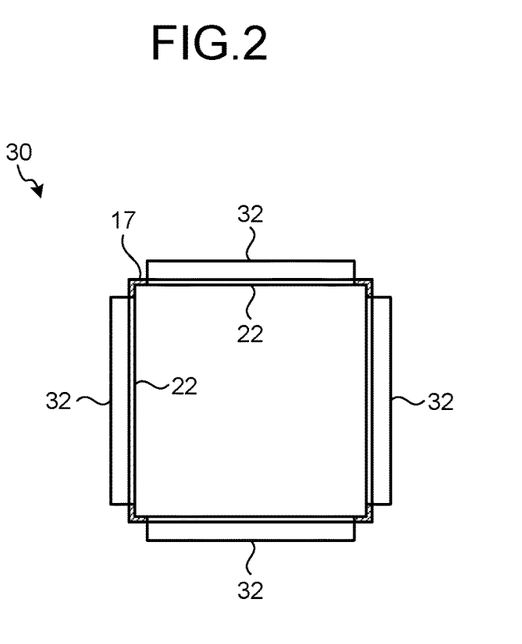
FIG. 2 is a cross-sectional view illustrating a general structure of the muffling device.
Figure 3:
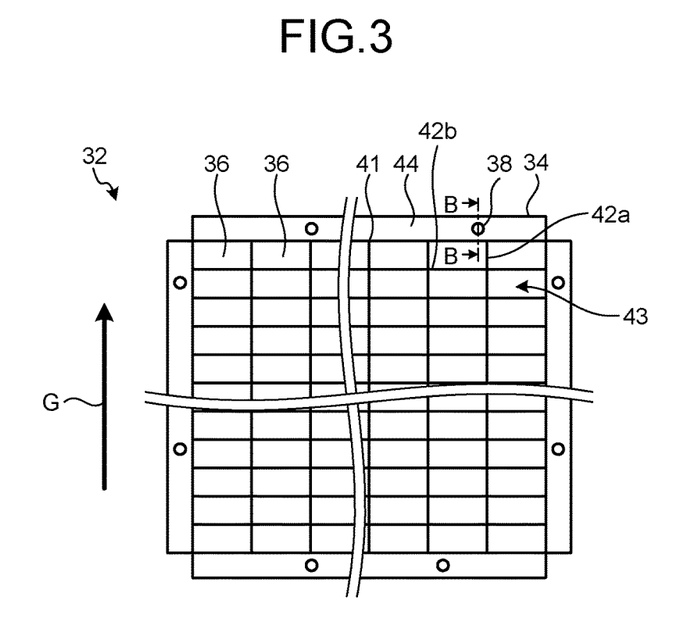
FIG. 3 is a front view when the muffling device is viewed from a gas flow passage side.
Figure 4:
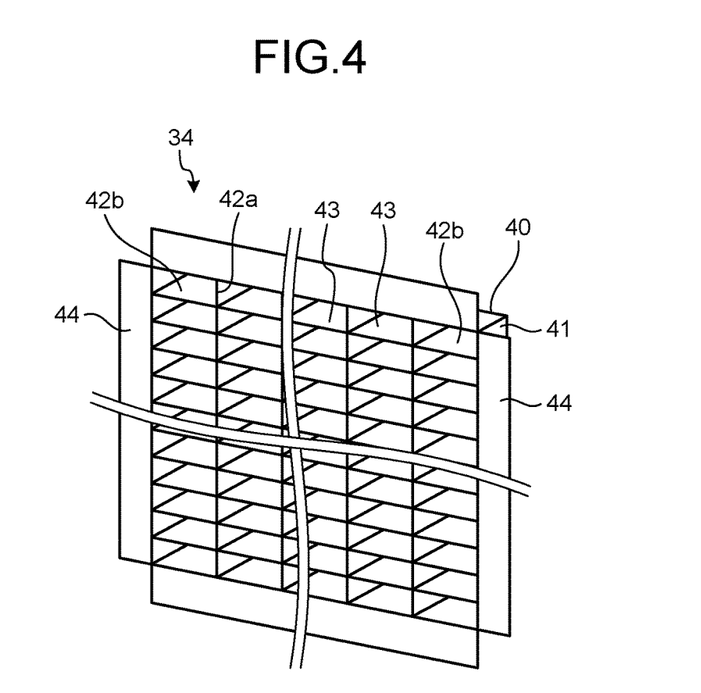
FIG. 4 is a perspective view illustrating a general structure of a holding section of the muffling device.
Figure 5:
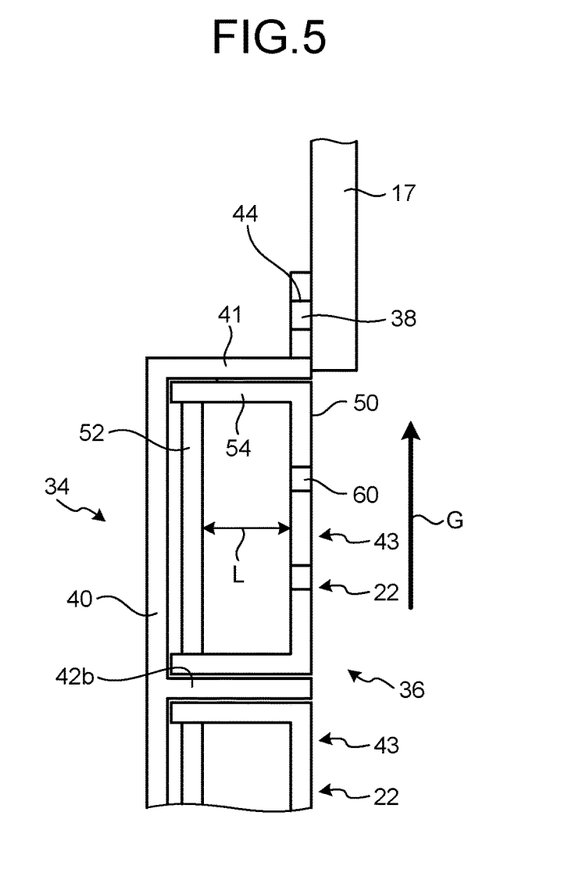
FIG. 5 is a cross-sectional view taken along a line B-B in FIG. 3.
Figure 6:
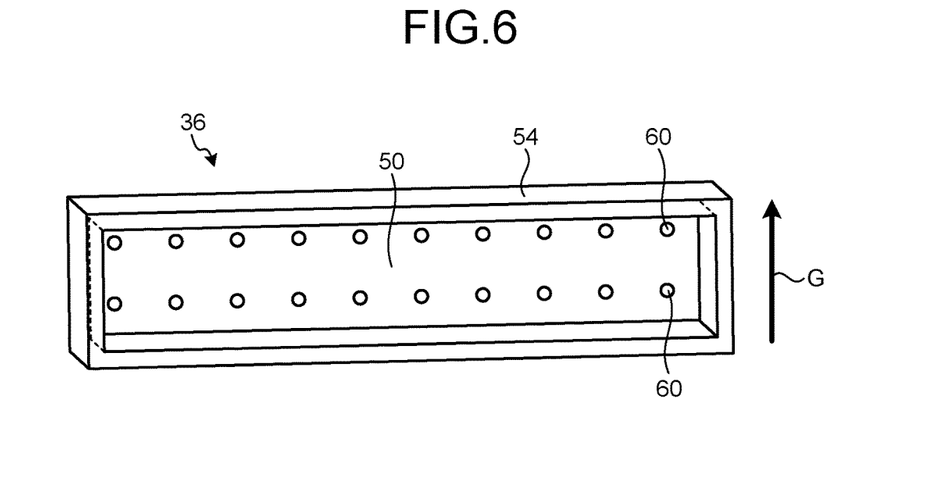
FIG. 6 is a schematic diagram illustrating a general structure of a muffler.
Figure 7:
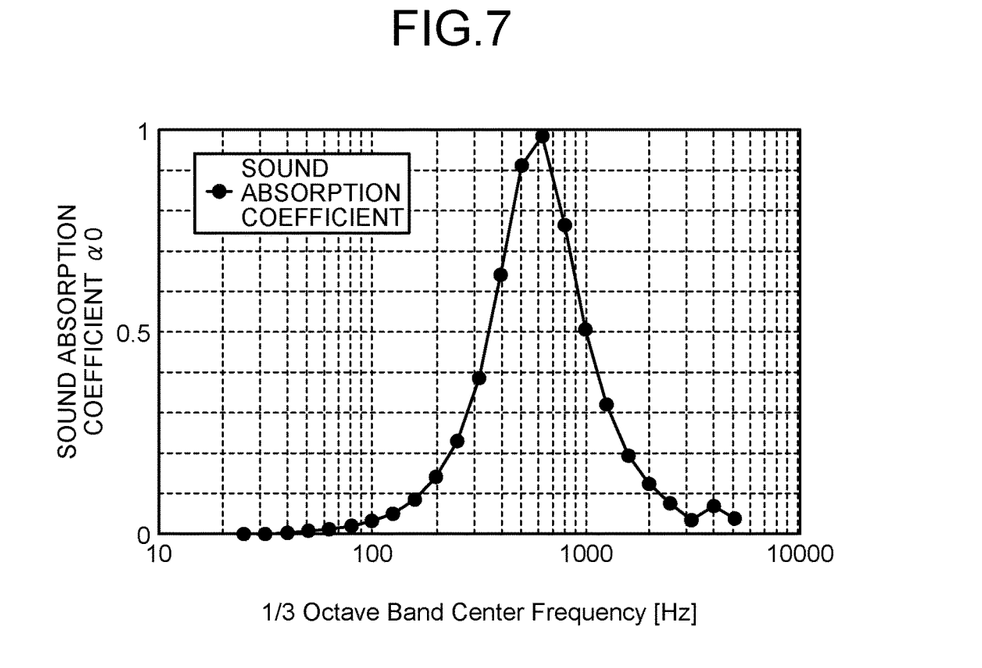
FIG. 7 is a graph illustrating an exemplary characteristic of the muffler.

Next, the muffling device 30 will be described by using FIGS. 2 to 7. FIG. 2 is a cross-sectional view illustrating a general structure of the muffling device. FIG. 2 is the cross-sectional view taken along a line A-A in FIG. 1. FIG. 3 is a front view when the muffling device is viewed from a gas flow passage side. FIG. 4 is a perspective view illustrating a general structure of a holding section of the muffling device. FIG. 5 is a cross-sectional view taken along a line B-B in FIG. 3. FIG. 6 is a schematic diagram illustrating a general structure of a muffler. FIG. 7 is a graph illustrating an exemplary characteristic of the muffler.

The muffling device 30 is installed at the supply air duct 17 as described above, and reduces noise generated when the gas G flows through the supply air duct 17. Here, as illustrated in FIG. 2, the supply air duct 17 according to the present embodiment is a square pipe conduit having four surfaces formed in a rectangular shape in the cross-section.

The muffling device 30 has a muffling unit 32 installed on each of the four surfaces of the supply air duct 17. The supply air duct 17 is formed with an opening 22 on the surface where the muffling unit 32 is provided.

The muffling unit 32 has one surface exposed to an inner surface of the supply air duct 17, namely, the surface where the gas G flows. The muffling unit 32 includes a holding section 34 and multiple mufflers 36.

The holding section 34 holds the multiple mufflers 36, and also is a member to cover the opening 22 of the supply air duct 17, and further includes a supporting surface 40, a frame 41, partitioning plates 42a and 42b, and a flange 44. The supporting surface 40 is a plate-like member having a size substantially same as the opening 22. The frame 41 covers an entire periphery of the surface on the opening 22 side of the supporting surface 40. With this structure, the holding section 34 is formed as a box including the supporting surface 40, the frame 41, and one surface opened (surface on the opening 22 side). The partitioning plate 42a is disposed in a flow direction of the gas G in a space enclosed by the supporting surface 40 and the frame 41. A plurality of the partitioning plates 42a is disposed at predetermined intervals in a direction orthogonal to the flow direction of the gas G, and divides the space enclosed by the supporting surface 40 and the frame 41 into a plurality of portions in the direction orthogonal to the flow direction of the gas G. The partitioning plate 42b is disposed in the direction orthogonal to the flow direction of the gas G in the space enclosed by the supporting surface 40 and the frame 41. A plurality of the partitioning plates 42b is disposed at predetermined intervals in the flow direction of the gas G, and divides the space enclosed by the supporting surface 40 and the frame 41 into a plurality of portions in the flow direction of the gas G. Thus, in the holding section 34, the space enclosed by the supporting surface 40 and the frame 41 is divided in a grid pattern by the partitioning plates 42a and the partitioning plates 42b. In the holding section 34, each of the spaces divided in the grid pattern (space enclosed by an adjacent partitioning plate 42a (one of end portions is the frame 41) and an adjacent partitioning plate 42b (one of end portions is the frame 41)) is formed as a recessed portion 43 to dispose the muffler 36. The flange 44 is disposed at an end portion on an opposite side of the supporting surface 40 of the frame 41 (end portion on the opening 22 side). The flange 44 extends outward from the frame 41. The holding section 34 has a fastening portion 38 provided at the flange 44, and is fixed to the supply air duct 17. As the fastening portion 38, a screw and a bolt, and the like can be used. Meanwhile, preferably, sealing is applied between the flange 44 and the supply air duct 17 so as to prevent leakage of the gas G. As a sealing mechanism, an O-ring and the like may be provided between the flange 44 and the supply air duct 17, or the flange 44 and the supply air duct 17 may be welded, too. Note that although a shape of holding section 34 of the present embodiment is a rectangular shape, the shape is not limited thereto. In the case where there is a part where the holding section 34 cannot be provided due to a peripheral structure of the supply air duct 17, the shape can be changed by cutting a corresponding shape of the part from the holding section. In this case, the shape of the opening 22 of the supply air duct 17 is also adjusted in the same manner.

The muffler 36 is housed in each of the recessed portions 43 of the holding section 34. In other words, the multiple mufflers 36 are disposed in a matrix direction. As illustrated in FIGS. 5 and 6, the muffler 36 is shaped like a box inside which a space is formed, and includes: a front surface 50 located on the opening 22 side and exposed to the flow passage where the gas G flows (inner surface of the supply air duct 17); a back surface 52 facing the front surface 50; and a side surface 54 disposed between the front surface 50 and the back surface 52 and covering peripheries of the back surface 52 and the front surface 50. In the muffler 36, the front surface 50 is integrally formed with the side surface 54, and the back surface 52 is fixed to the side surface 54 by welding and the like. Further, the front surface 50 and the back surface 52 are distant from each other by a distance L. Additionally, the muffler 36 is fixed to the holding section 34 by welding the partitioning plates 42a and 42b to the side surface 54 or the front surface 50. Further, the muffler 36 is disposed in a direction such that the flow direction of the gas G becomes a short-length direction of the front surface 50 and the direction orthogonal to the flow direction of the gas G becomes a longitudinal direction of the front surface 50.

The muffler 36 has a plurality of through-holes 60 formed on the front surface 50 as illustrated in FIGS. 5 and 6. The number of through-holes 60 arrayed in the flow direction of the gas G is two, and the number of the through holes arrayed in the direction orthogonal to the flow direction of the gas G is 10 or more. Since the through-holes 60 are formed in the muffler 36, an inner space enclosed by the front surface 50, back surface 52, and side surface 54 is connected to the space where the gas G flows.

Since the number of through-holes 60 arrayed in the flow direction of the gas G is set to two, the muffler 36 and the muffling device 30 can suppress circulation caused by a static pressure difference, and a sucking phenomenon or a blow-off phenomenon of the gas G can be prevented at the through-holes 60. Further, an attenuation effect of a sound wave can be secured regardless of a flowing condition. In other words, in the case of providing the multiple through-holes 60 in the flow direction of the gas G, the sucking phenomenon or the blow-off phenomenon of the gas G may unexpectedly occur and a noise reduction effect may be degraded due to the positions of the through-holes 60. However, by setting the number of the through-holes 60 arrayed in the flow direction of the gas G to two in the muffler 36 and the muffling device 30, movement of the gas G in the flow direction can be stabilized even inside the muffler 36 and in the vicinity of the front surface 50. This can improve the noise reduction effect.

Further, since the muffling device 30 has a structure obtained by combining the multiple mufflers 36 having the same shape, assembly is simplified. Furthermore, since the muffler 36 has a simple structure, manufacturing is simplified. This can reduce a work load to a worker and can reduce manufacturing cost and assembly cost.

Moreover, in the muffler 36, since the back surface 52 is a separate member of the front surface 50 and is fixed by welding and the like, the distance L between the front surface 50 and the back surface 52 can be adjusted to an optional position. With this structure, a frequency characteristic of the muffler 36 can be adjusted by adjusting the position of the back surface 52. In other words, the frequency at which a sound absorption coefficient illustrated in FIG. 7 becomes high can be set as a desired position. By this, the muffler 36 can adjust a frequency of a sound to be reduced in accordance with a characteristic of an apparatus to be installed. By this, the sound to be reduced by the muffling device 30 can be optionally adjusted, and noise can be more properly reduced. Further, in the muffling device 30, the mufflers 36 having different distances L may be arranged in a combined manner in the holding section 34.

Figure 8:
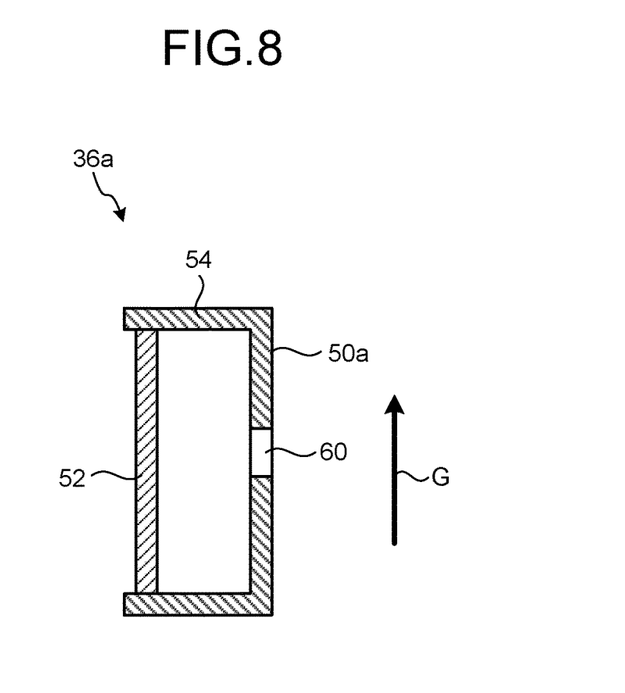
FIG. 8 is a schematic diagram illustrating a general structure of a muffler according to a different embodiment.

FIG. 8 is a schematic diagram illustrating a general structure of a muffler according to a different embodiment. Here, the number of through-holes 60 arrayed in a flow direction of a gas G is not limited to two although thus described in an embodiment described above. In a muffler 36a illustrated in FIG. 8, the number of the through-hole 60 arrayed in the flow direction of the gas G on the front surface 50a is one. Even in the case where the number of the through-hole 60 arrayed in the flow direction of the gas G is one, the same effects as described above can be obtained in the muffler 36a.

Further, in the muffler, the number of the through-holes in a direction orthogonal to the flow direction of the gas G is not particularly limited, but 10 or more and 20 or less are preferable. This can prevent an aspect ratio of the muffler from being extreme, can simplify manufacture, and further can simplify assembly therefor.

Further, a shape of the through-hole 60 is not particularly limited and may have a protrusion inside or may be tilted to a front surface 50.

Figure 9:
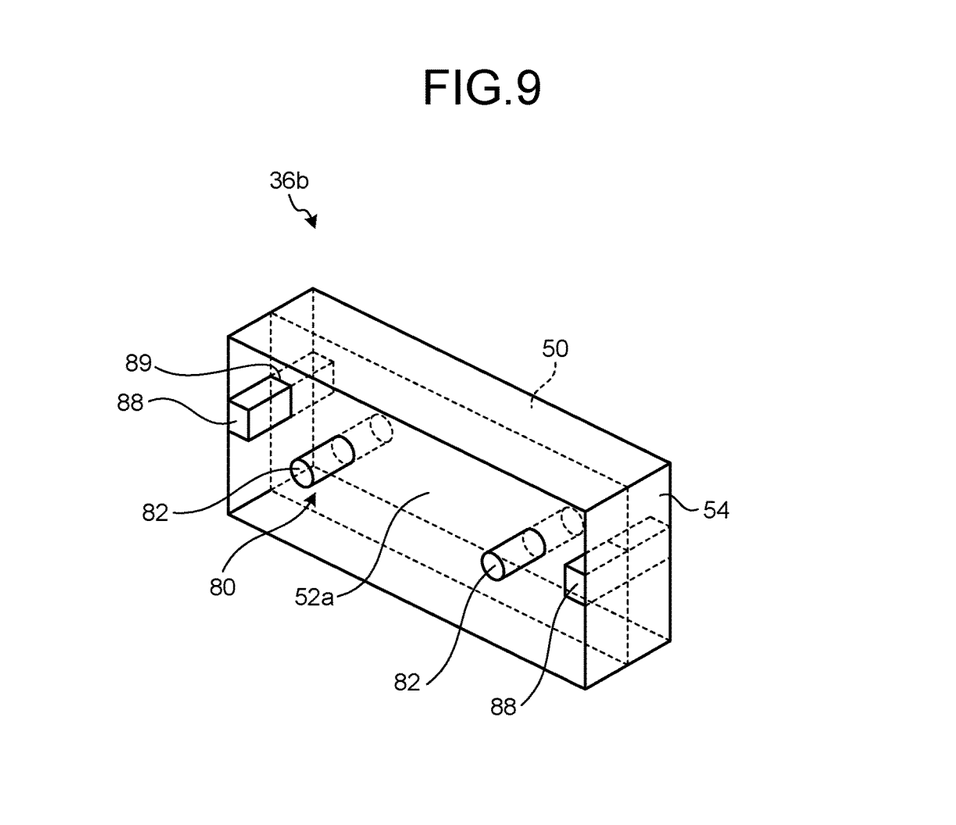
FIG. 9 is a perspective view illustrating a general structure of a muffler according to another different embodiment.
Figure 10:
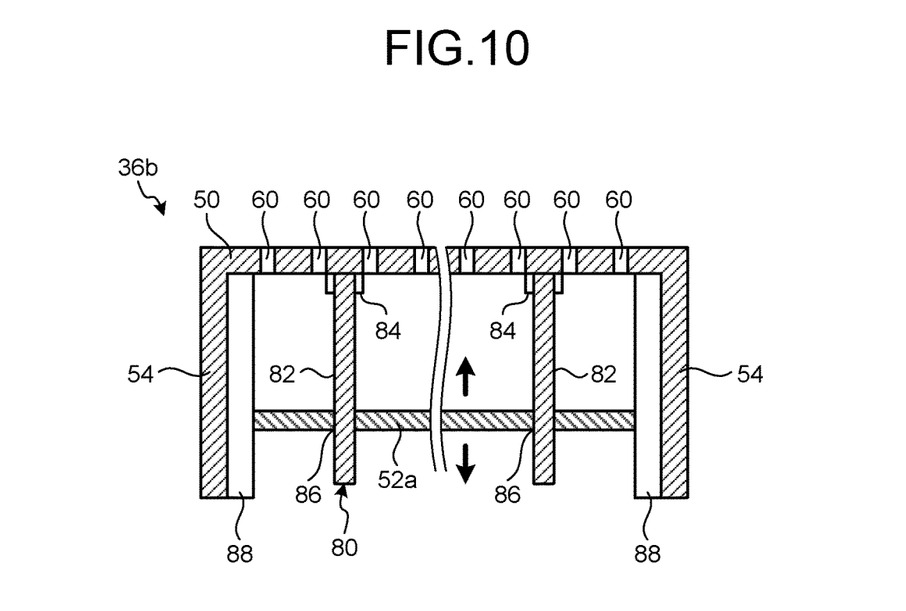
FIG. 10 is a cross-sectional view illustrating the general structure of a muffler according to a different embodiment.

FIG. 9 is a perspective view illustrating a general structure of a muffler according to another different embodiment. FIG. 10 is a cross-sectional view illustrating the general structure of the muffler according to another different embodiment. A muffler 36b is formed like a box inside which a space is formed, and includes: a front surface 50 located on an opening 22 side and exposed to a flow passage where a gas G flows (inner surface of a supply air duct 17); a back surface 52a facing the front surface 50; a side surface 54 disposed between the front surface 50 and the back surface 52a and covering peripheries of the back surface 52a and the front surface 50. Further, the muffler 36b includes an adjustment mechanism 80 to adjust a position of the back surface 52a relative to the front surface 50.

The adjustment mechanism 80 includes a bolt 82, a support nut 84, a thread groove 86, a rail 88, and a cut-away portion 89. The bolt 82 is a rod-like member formed with a thread groove 86, fixed to the support nut 84, and inserted into the thread groove 86. The support nut 84 is fixed to a surface of the front surface 50 on the back surface 52a side. The support nut 84 supports the bolt 82 in a rotatable manner in a state that an axial position of the bolt 82 is not moved even when the bolt 82 is rotated. The thread groove 86 is formed on the back surface 52a, and the bolt 82 is inserted thereto. Two each of the bolt 82, support nut 84, and thread groove 86 are disposed in a direction orthogonal to a flow direction of a gas G. The rail 88 is formed extending in a direction orthogonal to the front surface 50 and the back surface 52a, and disposed on an inner surface of the side surface 54. The rail 88 is engaged with the cut-away portion 89 formed on the back surface 52a.

When the bolt 82 is rotated, the adjustment mechanism 80 has the back surface 52a formed with the thread groove 86 moved along the rail 88 in directions indicated by arrows. This can optionally adjust a distance between the front surface 50 and the back surface 52a.

In the muffler 36b, the distance between the front surface 50 and the back surface 52a can be easily adjusted by providing the adjustment mechanism 80. Further, since the adjustment mechanism 80 adjusts the distance by rotating the bolt 82, it is possible to prevent the distance between the front surface 50 and the back surface 52a from being displaced from a desired position even in the case where the back surface 52a and the side surface 54 are welded after position adjustment. With this structure, the distance between the front surface 50 and the back surface 52a can be more accurately set.

Here, a muffling device in the embodiment described above is provided on every surface of a supply air duct 17, but not limited thereto, and the muffling device may be provided only some of the surfaces of the supply air duct 17. Further, in the case where a holding section 34 is provided same as the muffling device in the above-described embodiment, a holding surface of the holding section 34 may be the back surface.

Figure 11:
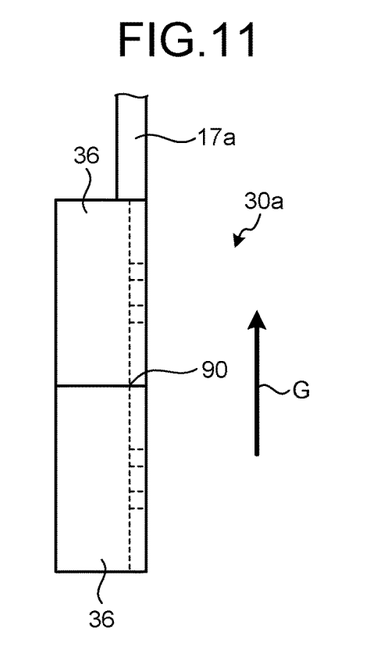
FIG. 11 is a schematic diagram illustrating a general structure of a muffling device according to a different embodiment.

Further, in the muffling device, leakage of a gas G from the supply air duct 17 can be prevented by simple construction work. Therefore, the holding section 34 is preferably provided, but not limited thereto. FIG. 11 is a schematic diagram illustrating a general structure of a muffling device according to a different embodiment. In a muffling device 30a illustrated in FIG. 11, a welding portion 90 is provided on a contact surface between a muffler 36 and a muffler 36, and forms a closed structure by welding. The muffler 36 is directly fixed to an opening of the supply air duct 17. Thus, combination of a back surface of the muffler 36 and the welding portion 90 may form a holding section that fixes the muffling device 30a to the supply air duct 17 without providing any holding section including a frame and a supporting surface.

Figure 12:
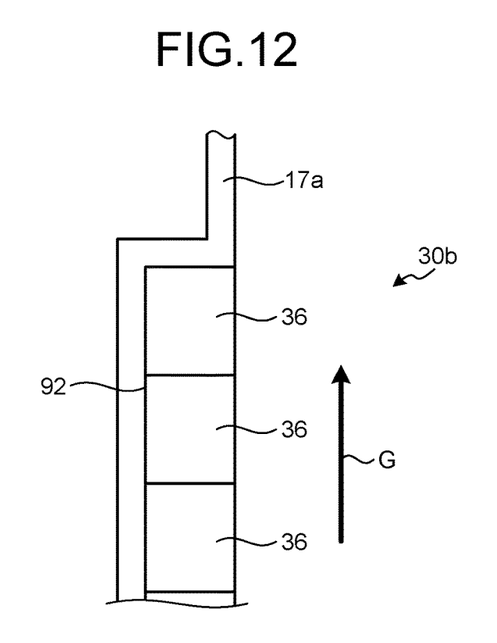
FIG. 12 is a cross-sectional view illustrating a general structure of a muffling device according to another different embodiment.

FIG. 12 is a cross-sectional view illustrating a general structure of a muffling device according to another different embodiment. In a muffling device 30b illustrated in FIG. 12, a plurality of mufflers 36 is disposed in recessed portions 92 provided in a supply air duct 17b. In other words, in the muffling device 30b, a wall surface of the supply air duct 17b functions as a holding section.

Figure 13:
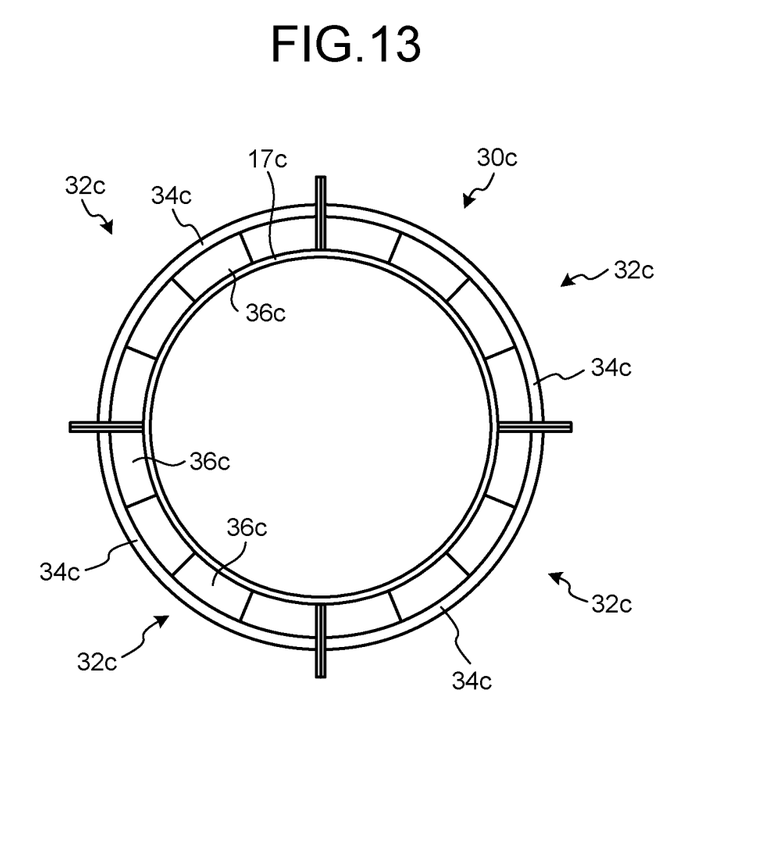
FIG. 13 is a cross-sectional view illustrating a general structure of a muffling device according to still another different embodiment.

Further, in an embodiment described above, it has been described that the muffling device is provided at a supply air duct having a rectangular cross-section, but not limited thereto. FIG. 13 is a cross-sectional view illustrating a general structure of a muffling device according to still another different embodiment. A supply air duct 17c illustrated in FIG. 13 has a circle shape cross-section. A muffling device 30c includes a plurality of muffling units 32c. The muffling units 32c are arranged in a certain angle range in a circumferential direction of the supply air duct 17c. Further, the plurality of muffling units 32c is adjacent in the circumferential direction. Each of the muffling units 32c includes: a holding section 34c in which a supporting surface is formed in an arc shape; and multiple mufflers 36c each having a front surface and a back surface which are formed in arc shapes. Thus, in the case where the supply air duct 17c has the circle shape, same effects can be also obtained by forming the holding section 34c and the mufflers 36c in the shape conforming to the suction duct 17c.

Meanwhile, the description has been given for the case where the present invention is provided in the supply air duct in the present embodiments, but the present invention can be also provided in an exhaust air duct or on wall surfaces of other various passages where a gas flows.

REFERENCE SIGNS LIST

1 COMPRESSOR UNIT
8 DRIVE SOURCE
10 COMPRESSOR
11 CASING
12 ROTARY SHAFT
13, 14 BEARING
15 IMPELLER
17 SUPPLY AIR DUCT
20 EXHAUST AIR DUCT
22 OPENING
30 MUFFLING DEVICE
32 MUFFLING UNIT
34 HOLDING SECTION
36 MUFFLER
38 FASTENING PORTION
40 SUPPORTING SURFACE
41 FRAME
42a, 42b PARTITIONING PLATE
43 RECESSED PORTION
44 FLANGE
50 FRONT SURFACE
52 BACK SURFACE
54 SIDE SURFACE
60 THROUGH-HOLE
80 ADJUSTMENT MECHANISM
82 BOLT
84 SUPPORT NUT
86 THREAD GROOVE
88 RAIL
90 WELDING PORTION
92 RECESSED PORTION

The invention claimed is:

1. A muffling device comprising:
a plurality of mufflers installed on a wall surface of a pipe conduit in which a gas flows; and
a holding section housing the plurality of mufflers and fixed to the wall surface,
wherein the plurality of mufflers respectively include:
a front surface exposed to an inner surface of the pipe conduit;
a bottom surface facing the front surface;
a side surface disposed between the front surface and the bottom surface, and configured to cover a space between the front surface and the bottom surface; and
a plurality of through-holes formed on the front surface, the number of through-holes arrayed in a flow direction of the gas being one or two, and the number of the through-holes arrayed in a direction orthogonal to the flow direction of the gas being 10 or more,
wherein the two through-holes arrayed in the flow direction are disposed to align in the flow direction.

2. The muffling device according to claim 1, wherein the number of the through-holes arrayed in the direction orthogonal to the flow direction of the gas is 20 or less on the front surface.

3. The muffling device according to claim 1, wherein the side surface is a member integrally formed with the front surface.

4. The muffling device according to claim 1, further comprising an adjustment mechanism configured to move the bottom surface relative to the front surface and adjust volume of a space between the front surface and the bottom surface.

5. The muffling device according to claim 1, wherein the holding section is formed with a plurality of recessed portions to house the mufflers in a direction parallel to flow of the gas.

6. The muffling device according to claim 2, wherein the side surface is a member integrally formed with the front surface.

7. The muffling device according to claim 2, further comprising an adjustment mechanism configured to move the bottom surface relative to the front surface and adjust volume of a space between the front surface and the bottom surface.

8. The muffling device according to claim 3, further comprising an adjustment mechanism configured to move the bottom surface relative to the front surface and adjust volume of a space between the front surface and the bottom surface.

9. The muffling device according to claim 2, wherein the holding section is formed with a plurality of recessed portions to house the mufflers in a direction parallel to flow of the gas.

10. The muffling device according to claim 3, wherein the holding section is formed with a plurality of recessed portions to house the mufflers in a direction parallel to flow of the gas.

11. The muffling device according to claim 4, wherein the holding section is formed with a plurality of recessed portions to house the mufflers in a direction parallel to flow of the gas.

12. The muffling device according to claim 2, further comprising an adjustment mechanism configured to move the bottom surface relative to the front surface and adjust volume of a space between the front surface and the bottom surface.

13. The muffling device according to claim 3, further comprising an adjustment mechanism configured to move the bottom surface relative to the front surface and adjust volume of a space between the front surface and the bottom surface.

* * * * *